April 15, 1958 V. E. TRINTER 2,831,190
WAVE ENERGY TRANSMISSION SYSTEM
Filed Jan. 12, 1952 2 Sheets-Sheet 1

INVENTOR.
VERNON E. TRINTER
BY
ATTORNEY

United States Patent Office 2,831,190
Patented Apr. 15, 1958

2,831,190

WAVE ENERGY TRANSMISSION SYSTEM

Vernon E. Trinter, Baltimore, Md., assignor to Philco Corporation, Philadelphia, Pa., a corporation of Pennsylvania Application January 12, 1952, Serial No. 266,123

15 Claims. (Cl. 343—854)

The present invention relates to apparatus for controlledly varying the phases of signals, and more specifically it relates to antenna arrays for the radiation of variably-directed beams of high frequency electrical energy.

It is known in the prior art to employ a linear array of spaced, radiating elements to obtain increased directionality in the radiation pattern of an antenna system. In such arrays the radiating elements are typically spaced along a straight line and supplied with energy for radiation from a concurrent feed means. The directionality of the resultant radiation pattern is determined primarily by the relative phases of the signals supplied to the individual radiators, compared to their mutual spacings. Thus, when the phase velocity of propagation of waves in the feed means approximates the phase velocity of electromagnetic waves in free space, the system operates as an end-fire array to produce a radiated energy pattern having a maximum in a direction substantially along the line of the array. However, if the phase velocity of propagation in the feed means is increased so as to reduce substantially the phase difference between signals supplied to successive radiators, the conditions for broadside operation are approached, in which the beam is radiated in a direction more nearly perpendicular to the line of the array. It is therefore possible to accomplish directional variation in one plane of the beam of such a linear array, by variation of the phase velocity of propagation in the feed means supplying signals to the individual radiators. Such variation in phase velocity may readily be accomplished by any of a variety of methods well known in the art.

It is also known to arrange a plurality of such linear arrays side by side, to form a bidimensional array of radiators occupying a predetermined area hereinafter termed the aperture of the complete array. The dimension of of the bidimensional array in the direction of the individual arrays will be denoted hereinafter as the longitudinal dimension or height, of the aperture, and the dimension transverse to the individual arrays as the width. Further, it will be convenient to refer to angles measured with respect to the plane of the antenna aperture as elevation angles, and to refer to angles measured with respect to a plane normal to the plane of the aperture and parallel to one of the component arrays, as azimuth angles. The radiators of the individual linear arrays then provide elevational directivity for the resultant radiated pattern, while the transverse stacking of radiators across the width of the antenna aperture provides directivity in azimuth. The relative phasing of the signals supplied to radiators lying along the same transverse line across the antenna aperture determines the direction of the radiated beam in azimuth. When these transversely-spaced radiators are supplied with signals of substantially identical phase, the transverse stacking of radiators produces broadside operation, resulting in a beam of radiated energy having its azimuthal maximum at zero degrees.

To vary the elevational angle of the beam pattern of the complete bidimensional array, the phase velocities of propagation characteristic of the individual feed means of the separate linear arrays may appropriately be varied in synchronism. However, it is often required that this motion of the beam in elevation be accomplished without producing any substantial degree of corresponding variation in the azimuthal pattern of the antenna. In order that this independence be maintained, it is generally necessary that the relative phase condition existing transverse to the individual arrays, across the width of the antenna aperture, be maintained substantially invariant as the beam is angularly deviated in elevation. In other words, an isophase line connecting points of the same phase across the width of the bidimensional array should remain an isophase line as the phase velocity of propagation is varied in the individual feed means associated with the separate linear arrays, if independence of azimuth pattern and elevational pattern is to be maintained. Preservation of this invariant phase condition is also significant in avoiding variations in the elevational pattern of the beam as its elevational direction is varied.

While in certain special circumstances the above-mentioned independence of azimuth and elevational patterns inherently obtains to a substantial degree, in other instances it has not heretofore been obtainable. For example, when there is employed a bidimensional array of the general type described hereinbefore, in which the lengths of the regions of variable phase velocity in the several feed means, from the input ends thereof to any transverse isophase line passing through laterally-displaced points of the antenna aperture which are to remain in the same relative phases, differ for the several component arrays, then synchronous variation of the phase velocities in the above regions by the same amounts in order to vary the elevation angle of the radiated beam will tend also to vary greatly the azimuthal pattern of the radiated beam.

As an example of an application in which the latter condition obtains, the preferred embodiment of the invention described in detail hereinafter comprises a bidimensional antena having a circular outline and a circular aperture. This circular antena may, for example, be carried by an aircraft as the radiating element of a search radar, may be mounted but slightly below the undersurface of the aircraft in an orientation generally parallel to the plane of the surfaces of the aircraft wings, and may be rotated about an axis perpendicular to the plane of the aircraft wings to effect azimuthal scanning. To permit stabilization of the antenna beam for variations in the angle of attack of the aircraft, the above-mentioned means for varying the elevation angle of the radiated beam by variation of the phase velocities in component arrays, may be controlled by suitable gyroscopic means to maintain the radiated beam at a constant angle to the surface of the earth. The phases of points in the aperture which are displaced only laterally, are preferably all the same, thereby producing a broadside beam in azimuth.

With this antenna, a high degree of efficiency is attained with regard to the antenna gain obtainable, as compared to the aerodynamic drag produced by the protruding antenna and its housing, for only a very short, generally cylindrical housing need be provided exterior to the aircraft surface in the airstream of the aircraft, and, by spacing the radiating elements about a circular aperture comprising a normal section of this cylinder and as near to the walls thereof as is practical, the largest rotatable antenna aperture, the greatest antenna gain, and hence the sharpest beam, may be obtained.

However, because of the locations of the first radiator of each component array, and hence of the input ends of the regions of variable phase velocity of the feed guides, along an arc as near to the periphery of the circular outline of the entire array as is practical, the distances along the several feed means, from the input ends of the regions of variable phase velocity thereof, to any transverse straight line lying across the circular aperture, are different for the several component arrays. Variation of the phase velocity in these regions to produce elevational variation of the beam direction therefore produces different amounts of phase variation for signals along the above-mentioned transverse line, in the several component arrays. As a result, the lateral phase relation across the aperture varies. Furthermore, this variation in lateral phase relation differs for different transverse lines, and, consequently, not only may the beam direction change, but the character of beam itself may change substantially.

In any such arrangement in which the distances between the input ends of the regions of variable phase velocity and the desired isophase line, as measured along the individual feed means, differ for different ones of the linear arrays, changing of the phase velocity in the individual feed means will tend not only to effect desired variations in the relative phasings of the signals supplied to the radiators spaced along each array, but also undesirably to affect and modify the relative phases between the transversely-spaced radiators. Thus, although it is possible to phase the input signals to the different arrays differently, so as to compensate for the differences in phase delay for one elevational position of the radiated beam, such an arrangement is no longer effective when the elevational angle of the beam is shifted to a new position. For with a shift in the elevational position of the beam, the phase velocities in all of the regions of different lengths are caused to vary by the same percentage, and therefore by different amounts. The shift in the phase of signals along any given isophase line will therefore be different for the different arrays, and the lateral phase relation among the radiators is thereby disturbed so as to effect an undesired variation in the azimuthal pattern of the antenna.

It is therefore an object of my invention to provide a system for maintaining substantially invariant the phase relation between signals at predetermined points in different transmission devices, despite variations in the phase velocities of signals in said transmission devices.

Another object is to provide an antenna system comprising a plurality of laterally-displaced arrays, each array comprising a plurality of radiators supplied with energy from spaced points along a region of a feed means which is of controllably-variable phase velocity, each of said regions of said feed means having an input end to which signals to be radiated may be supplied, in which antenna array the same relative phase may be maintained along a predetermined line transverse to said arrays despite variations in said phase velocity in said regions, and despite differences in the respective distances from said transverse line to said input ends of said regions of variable phase velocity.

Another object is to provide an antenna system comprising a bidimensional array for illuminating an aperture of curvilinear contour, in which the relative phasings of the signals supplied to radiators spaced along one dimension of said array may be varied by varying the phase velocity of propagation of signals in a plurality of feed means, while reducing substantially variations which tend to occur in the phase relation of radiators spaced along a line transverse to said first dimension.

A still further object is to provide a bidimensional antenna array having an aperture which is a transverse section of a cylinder, in which the direction of the major lobe of the beam radiated therefrom, relative to the antenna structure, may be caused to vary controlledly in a direction parallel to a first reference plane, without thereby seriously modifying the characteristics of the antenna pattern in a direction parallel to a second reference plane perpendicular to said first reference plane.

In accordance with the invention, the above objectives may be achieved by employing phase-compensating, signal-transmission devices for at least all but one of the feed means of differing lengths associated with the linear arrays. Each compensating signal-transmission device comprises a region controllable as to the phase delay of signals therein, and is connected to supply signals from a source of high frequency energy to one of the feed means. The region of variable phase delay for each compensating transmission device is so chosen, with relation to the region of variable phase velocity of the corresponding feed means, that the sum of the phase delay provided by the region of variable phase delay of each compensating waveguide, plus the phase delay provided by that portion of the region of variable phase velocity of the corresponding feed guide which extends from the input end thereof to any given isophase line transverse to the component arrays, equals a value which is the same for each compensating transmission device and its associated feed means. Although the value of this sum may be varied as the phase velocities are varied to produce changes in the direction of the radiated beam, nevertheless it is maintained substantially the same for all pairs of feed guides and associated compensating transmission devices. Thus, the phase delays of the compensating transmission devices and of their corresponding associated feed means may be varied synchronously, and by the same amount for each pair. Signals applied to the input ends of the various compensating signal-transmission devices in appropriate phases to produce the desired isophase line across the antenna aperture, will then experience a phase delay in travelling through the above-specified regions of variable phase delay of the compensating devices and of the feed means, which is the same for all of the component linear arrays. Points along any isophase line will therefore remain in the same relative phase despite variations in the phase velocity in the various feed means, and the azimuthal pattern of the complete array will therefore remain substantially invariant despite the elevational motion of the radiated beam.

Other objects and features of the invention will be more fully appreciated from a consideration of the following detailed description, taken in conjunction with the accompanying drawings, in which.

Figure 1:
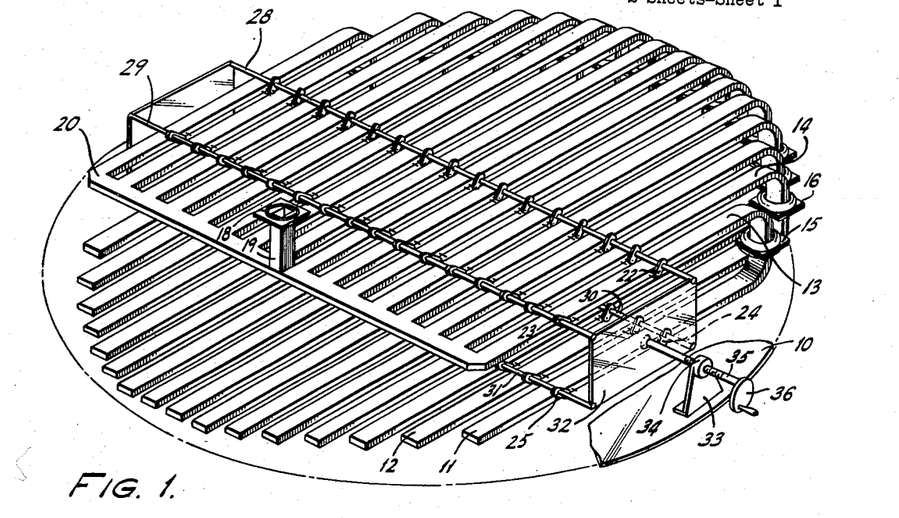
Figure 1 is a perspective view of a simplified version of an antenna array embodying the invention, showing the general arrangement thereof.

Referring specifically to Figure 1, the simplified embodiment of the invention represented therein comprises a lower assembly of sixteen waveguide feed means having their longitudinal axes disposed substantially parallel each to the other and mounted upon a circular metal base plate 10 with their lower broad faces lying in the same plane, together with an upper assembly of phase-compensating waveguide sections, each phase-compensating waveguide being coupled to a corresponding feed guide by an appropriate connector. Thus, feed guides 11 and 12 are connected to phase-compensating waveguides 13 and 14 by means of connectors 15 and 16, respectively.

Each feed guide is recessed into an appropriate opening in base plate 10, preferably so that the lower broad face of each of the feed guides lies in the plane of the bottom surface of plate 10. As will be pointed out in more detail hereinafter in particular connection with Figure 2, the lower broad faces of the feed guides are provided with a plurality of transverse slots which serve as radiators of high-frequency energy supplied thereto through the above-mentioned feed guides.

High-frequency energy to be transmitted may then be supplied from a suitable source through input connector 18, input waveguide 19, crossfeed means 20, the upper assembly of phase-compensating wave guide sections, and the lower assembly of feed guides, whence radiation by means of the above-mentioned transverse slots is accomplished.

The dimensions of the various waveguides may each be chosen to provide progagation in the dominant, or $TE_{1,0}$, mode for signals at the frequency to be transmitted. For a source frequency of 9400 megacycles per second, for example, the interior height of each of the waveguide structures may suitably be 0.4 inch and the interior width 0.9 inch.

Signals from crossfeed 20 are distributed to the phase-compensating waveguides by means of right-angle H-plane bends for the two end arrays, and by H-plane T-junctions for the remaining arrays. The relative quantities of energy coupled into the compensating waveguides from the crossfeed may be controlled in design by appropriate adjustment of the apertures between the crossfeed and the compensating guides, or by means of suitable inductive irises spaced along the crossfeed, in a manner well known in the art.

Also included in the complete antenna assembly are means for varying the phase velocity of propagation in the compensating-waveguide sections and in the feed guides. In the present embodiment, these variations in phase velocity are accomplished by means of variations in the transverse positions of strips of dielectric material longitudinally disposed in the phase-compensating waveguides and in the feed guides. As will become apparent hereinafter in connection with Figure 3, the dielectric strips are fastened to arm members such as 22 and 23 for phase-compensating guide 13, and 24 and 25 for feed guide 11, these arms being affixed to transverse rods 28, 29, 30 and 31, respectively, which rods in turn are each fastened to a common connecting-plate member 32, arranged to be reciprocated in response to manual actuation. To facilitate this reciprocation, there is provided a bracket member 33 mounted upon base plate 10, and provided with an internally-threaded nut member 34 for receiving externally-threaded screw member 35. One end of screw member 35 is affixed to connecting plate member 32, and the opposite end thereof is provided with a rotatable crank member 36 for effecting rotation of screw member 35. Operation of crank member 36 may then impart a reciprocating motion to connecting-plate member 32, to rods 28, 29, 30, 31, and to each of the arm members such as 22, 23, 24, 25. The dielectric strips fastened to the reciprocating arm members and lying within the waveguides of the array, are then caused to move laterally in unison, in a direction dependent upon the direction of rotation of the crank member.

Figure 2:
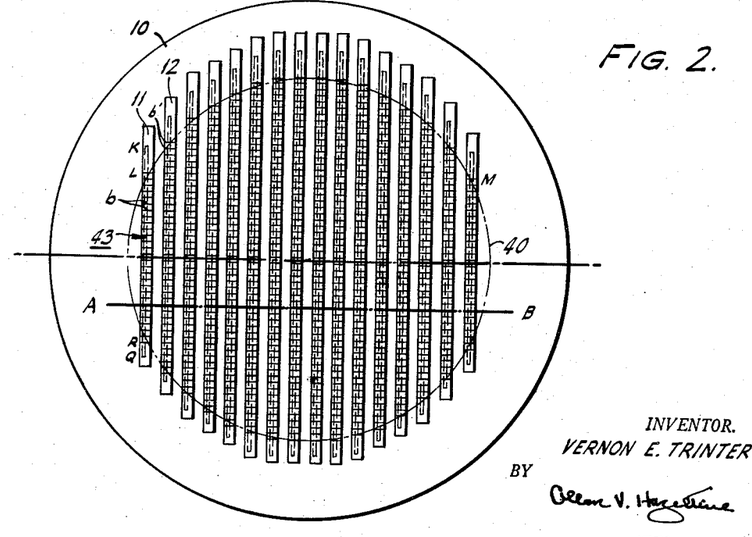
Figure 2 is a bottom view of the antenna array of Figure 1, showing particularly the arrangement by means of which radiation is effected.

Referring now to the bottom view of the complete antenna array as represented on reduced scale in Figure 2, in which like numerals denote like parts, the arrangement of the radiating slots in the lower, broad faces of the feed waveguides is represented generally therein. The bottom surfaces of each of the waveguide feed means, such as 11 and 12, which lie flush with the under-surface of base plate 10, are each provided with a plurality of spaced, transverse slots such as $b$ and $b'$. It is these slots which comprise the radiators by means of which high-frequency energy in the feed guides is transmitted into space. These slots are spaced substantially uniformly throughout the circular aperture of the complete array which is defined by circular line 40. The first radiating slots of the component arrays to which high frequency energy is supplied from the upper waveguide assembly, are located along minor circular arc LM.

Each slot extends across the entire width of the feed guide in which it is located, and has a width in the longitudinal direction of the feed guide which is determined by the energy remaining in the wave signals supplied thereto, and by the proportion thereof which it is desired to radiate from that region of the antenna aperture. The widths of the slots are therefore determined with reference to two predetermined amplitude-distribution functions, one for the amplitude distribution along the longitudinal dimensions of the feed guides, and one for the amplitude distribution in the transverse direction across the width of the complete antenna aperture. Considerations relating to the choice of such amplitude distributions, and methods for determining the widths of the slots to accomplish such distributions, are well known in the art, and need not be described here in detail. In general, to reduce the magnitudes of undesired minor lobes in the radiation pattern of the complete array, these functions will be such as to provide a maximum of radiated energy near the center of the antenna aperture and progressively less energy toward the periphery of the aperture.

The spacings of the transverse slots along the component arrays are not critical, but are preferably less than $0.5\lambda$, where $\lambda$ is the wavelength of the signal in free space, if undesirable effects of secondary maxima in the radiation pattern are to be avoided. Neither are the transverse spacings of the component arrays especially critical, although there will typically be a maximum desirable spacing for any value of maximum elevation angle which, if exceeded, may also result in the generation of undesirably large secondary maxima in the radiation pattern. Typically, the slot spacings along the component arrays may be $0.4\lambda$ in each case, and the spacings between adjacent ones of the component arrays may be $1.4\lambda$, for example, where the maximum elevation angle of the beam is 35 degrees.

Also shown in Figure 2 in dotted outline, inside the feed waveguides, are the dielectric strips upon the transverse position of which depend the phase velocities of propagation within the feed guides, and hence the elevation angle of the radiated beam. These dielectric strips extend at least throughout the region of each component array within which slot radiators are provided, and may extend beyond. Thus, dielectric strip 43 of feed guide 11 extends from point K, situated just prior to the input of the antenna aperture at point L, to a point Q, situated beyond the last slot located at point R on the opposite side of the antenna aperture from point K. The region of feed waveguide 11 extending from point K to point Q therefore comprises the region of variable phase velocity of guide 11. A similar region exists for each feed guide throughout the portion of its length occupied by the movable dielectric strip contained therein. Motion of the dielectric strips transversely away from the centers of the feed guides results in an increase in the phase velocity of propagation therein, and an increase in the elevational angle of the radiated beam corresponding to more nearly broadside operation. Conversely, motion of the dielectric strips toward the centers of the respective feed guides decreases the phase velocities in the guides and results in conditions which more nearly simulate those for end-fire radiation so that the elevational angle of the radiated beam is decreased.

Figure 3:
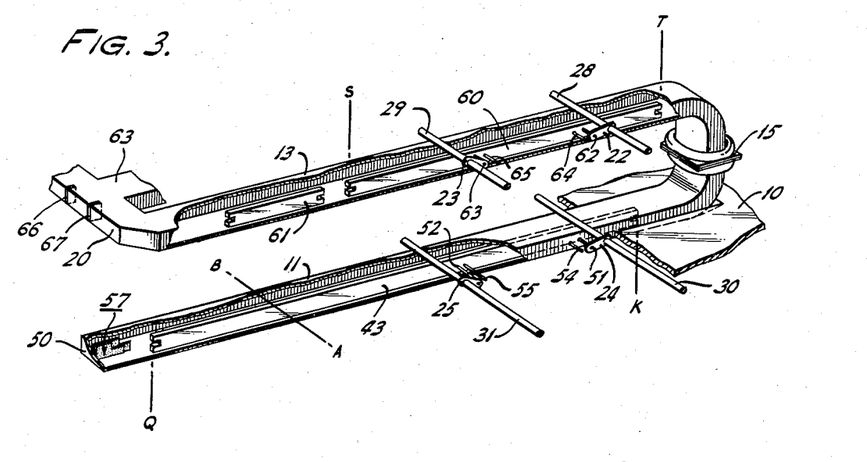
Figure 3 is a perspective view, partly broken away, of a portion of the array of Figure 1, showing the detailed arrangement thereof.

The details of construction of the complete array of Figure 1 will be more fully appreciated from a consideration of the drawing of Figure 3 showing the arrangement of the end phase-compensating waveguide 13 and end feed guide 11 of the complete array, wherein like numerals again denote like parts. Feed guide 11 extends from connector 15 to guide-terminating end plate 50, and is recessed into base plate 10 so that its lower broad face is flush with the undersurface of the latter base plate. As is shown in Figure 2, the lower face of feed guide 11 contains a plurality of transverse slots through which radiation occurs.

Mounted within feed guide 11 is dielectric strip 43, which is preferably straight and of uniform height and width, extending throughout the region of feed guide 11 which contains radiating slots. The material of which the dielectric strip is composed preferably possesses relatively low electrical losses at the frequencies of the signals to be radiated, and a dielectric constant substantially greater than unity. Suitable materials for this purpose include any of a variety of plastics such as polystyrene. Although the dielectric strip may be tapered at each end to provide satisfactory matching to the guide, adequate matching and shortening of the assembly may be accomplished, as shown in Figure 3, by utilizing a centrally-disposed, transverse notch at each end of the dielectric strip, the depth of the notch being approximately a quarter wavelength of the signal in the feed guide. Such matching arrangements are well known in the art and need not be described here.

Dielectric strip 43 is held within feed guide 11 by means of mounting pins 51 and 52. Pins 51 and 52 may be threaded into the dielectric strip 43, and protrude through small apertures in the side wall of the feed guide to the exterior, where they are affixed to arm members 24 and 25 respectively.

Arm members 24 and 25 are rigidly affixed to transverse rods 30 and 31, respectively, which, as described hereinbefore, are susceptible of reciprocation by means of rotation of crank member 36 as shown in Figure 1. Also fastened to dielectric strip 43, and lying parallel to the mounting pins attached to arms 24 and 25, are matching pins 54 and 55, which serve to cancel electrical reflections introduced by their associated mounting pins.

Situated in feed guide 11 near the closed end thereof is a load device 57 for absorbing any power remaining in the incident signal at this point, so as to eliminate reflections from end plate 50. Load device 57 may, in the present instance, comprise a pair of strips of an electrically lossy material, such as the phenol formaldehyde known as synthane, disposed side by side and normal to the broad surfaces of the waveguide near the center thereof. Preferably, each strip of load 57 presents a leading edge to the incident wave energy which is in the form of a quarter-wavelength step transition, and one of the strips preferably extends beyond the other in the direction of the source of wave energy by approximately one quarter of the wavelength in the guide, to minimize electrical reflections. Other suitable load devices of well known form, such as tapered sections of porcelain-base materials, may alternatively be utilized in certain other applications, as will occur to one skilled in the art.

Phase-compensating waveguide section 13 includes a movable dielectric strip 60, which may be substantially identical in form and lateral position with dielectric strip 43 in feed guide 11 except for the length thereof, and a fixed dielectric strip 61 which, in general, may differ in form or lateral position from dielectric strips 43 and 60. The mounting arrangement and reciprocating means for movable dielectric strip 60 are also similar to those employed for dielectric strip 43, including a pair of mounting pins 62 and 63 for affixing the dielectric strip to arms 22 and 23, together with matching pins 64 and 65 for reducing reflections from their associated mounting pins. Arms 22 and 23 are rigidly fixed to transverse rods 28 and 29, respectively, which move in synchronism with rods 30 and 31 in response to motion of crank 36 of Figure 1, so as to effect synchronous variation of the phase velocity of propagation in region ST of guide 13 and region KQ of feed guide 11.

Dielectric strip 61 comprises a fixed phase-compensator, the length, width, or lateral position of which may be designed to provide the proper phase of signal to movable phase-compensating dielectric strip 60. The considerations determining the lengths and dimensions of movable dielectric strip 60 and fixed dielectric strip 61 will be indicated in detail hereinafter.

Crossfeed 20 is a non-resonant device in which distribution of energy to the various phase-compensating wave guides is accomplished by means of simple shunt junctions and appropriate inductive irises such as 66 and 67. The sizes and locations of these irises will be determined in accordance with the particular amplitude distribution of energy which is desired in the transverse dimension of the complete antenna aperture, and need not be considered here in detail.

Referring again to Figure 2, in the present embodiment of the invention it is desired that signals in the several component arrays be in substantially the same phase along any transverse line, such as AB, disposed normally to the longitudinal dimensions of the feed guides. This condition is to be maintained despite variations in the elevational angle of the radiated beam produced by variations in the phase velocities of propagation in the component arrays. Considering first a reference condition in which the movable dielectric strips in the feed guides of the lower assembly are located in their positions of maximum deviation from the center of their respective waveguides, and in which the movable dielectrics of the upper assembly are also in their positions of maximum deviation from their central locations, the fixed compensating dielectric strips such as 61 of Figure 3 may be adjusted either as to their length or width, or even as to their lateral position in the waveguide, so that signals travelling from input connector 18 of Figure 1 to a transverse isophase line such as AB of Figure 2, all experience the same total phase delay. The condition of identical transverse phase will then be attained for this reference condition. However, it will be apparent from Figure 2, that when the dielectric strips in the lower assembly of feed guides are moved laterally so as to move the radiated beam in elevation, the increments of phase delay of signals along transverse line AB occasioned by this lateral motion of the dielectric strips will not be equal. This is because the lengths of the regions of variable phase velocities of the feed guides, from the input ends of the dielectric strips to which high frequency energy is first applied, to transverse line AB, are different for the different component arrays, and the total phase delays provided by these regions therefore also differ. Further, since the lateral motion of the dielectric strips of the lower assembly produces the same fractional or percentage change in phase delay for the region of each feed guide extending from the input ends of the movable dielectric strips to transverse line AB, the phase relations of signals along transverse line AB will, in general, no longer be identical for all of the component arrays when the dielectric strips are subjected to such motion. Therefore, without the phase-compensating arrangement of the upper assembly of waveguides which is provided by my invention, the elevational motion of the radiated beam occasioned by lateral motion of the dielectric strips in the lower assembly of feed guides will be accompanied by a substantial alteration of the azimuthal pattern of the radiated beam.

However, in accordance with my invention, the phase-compensating waveguide section connected to each component array is such that the total phase delay experienced by wave signals in passing through the region of variable phase velocity in the upper waveguide and through at least a portion of the corresponding region of variable phase velocity in the associated lower waveguide, is the same for all points lying along the same transverse isophase line AB. In the preferred embodiment exemplified herein, this is accomplished by making the sum of the length of the movable dielectric material in each phase-compensating waveguide plus the length of the movable dielectric material in the feed guide up to any isophase line, the same in each instance. Thus, in Figure 3, the length ST of the movable strip 60 in the upper, phase-compensating guide 13, plus the length of the dielectric strip 43 in the lower feed guide 11, from the input end thereof at K to the isophase line AB, has a predetermined value which will be designated $s_0$. Similarly then, the sum of the lengths of the bottom phase-varying dielectric strip in any feed guide, from the input end thereof to the same transverse line AB, plus the length of the upper, phase-compensating dielectric strip associated therewith, is substantially equal to $s_0$ in every case.

As a result, the total phase variation along isophase line AB due to similar transverse variations in the positions of the phase-varying and phase-compensating dielectric strips, is the same for each array, and the transverse phase relations of radiated signals across the antenna aperture remain substantially invariant. To obtain the particular transverse phase relation desired, the phase delays provided by the stationary dielectric strips such as 61 of Figure 3, should be adjusted, as indicated hereinafter.

Figure 4:
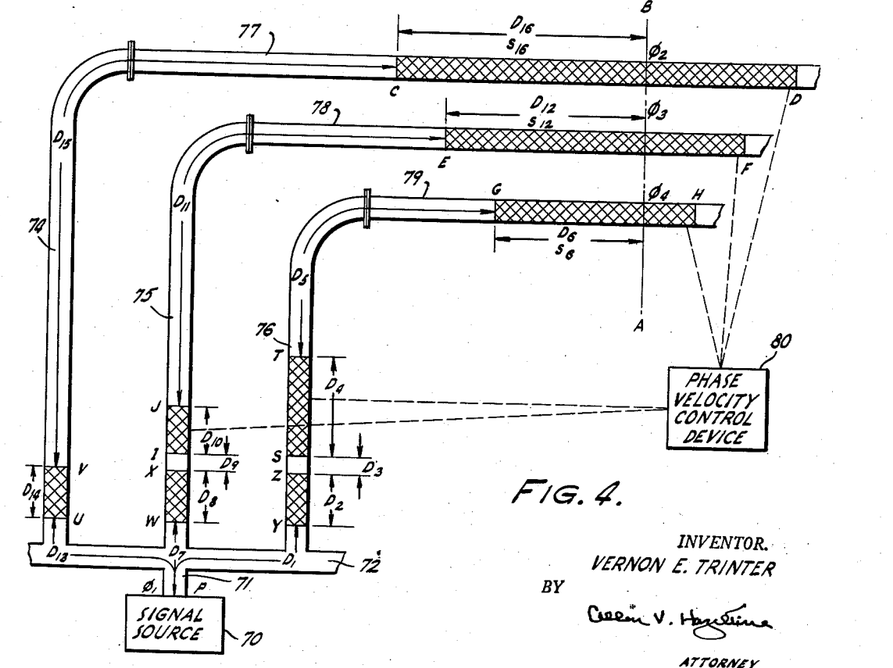
Figure 4 is a schematic representation of a portion of a signal phasing system employing the invention, to which reference will be made in explaining the theory and mode of operation of the invention.

The theory of operation and the method of adjustment of the antenna apparatus of my invention will be more fully comprehended by reference to the schematic representation of Figure 4. Referring to this figure, signal source 70 may be a radar transmitter or any other suitable source of high-frequency wave energy, while common transmission device 71 may be a conventional antenna line of waveguide as in Figure 1, a concentric transmission line, or an equivalent device. Signals from source 70 are supplied through common transmission device 71 to signal distributing means 72, which corresponds to crossfeed 20 of Figure 1, but which may take any of a variety of forms well known in the art for distributing signals from a common source to a plurality of signal utilization devices in predetermined relative phases.

Signal transmission devices 74, 75 and 76 may correspond to different ones of the phase-compensating waveguides of Figure 1, while transmission devices 77, 78 and 79 may represent the corresponding feed guides of the latter figure, although the principle of the invention is applicable to systems employing transmission devices of any of a variety of differing forms.

The shaded areas CD, EF and GH of the transmission devices 77, 78 and 79 represent, respectively, the regions of these transmission devices in which it is desired to vary the phase velocity of signals. These regions correspond to the regions of the feed guides of Figure 1 which contain the movable dielectric strips. Phase-velocity control device 80 represents any appropriate means for effecting the above-mentioned variation in phase velocity in transmission devices 77, 78 and 79. In the particular embodiment of Figure 1, the phase velocity is varied through variation of the transverse positions of dielectric strips in waveguides by mechanical means. However, other effects, such as variation in the physical width of a waveguide, variation of the pressure of a gas within a waveguide, or variation of the voltage stress in a ferroelectric material such as barium titanate disposed within a transmission device, may be employed instead to produce the desired variation.

The regions IJ and ST of transmission devices 75 and 76, respectively, represent regions of controllably-variable phase delay, corresponding to the regions of the phase-compensating waveguides of Figure 1 which contain the above-described movable dielectric strips, but generally representative of any region of variable phase delay regardless of the particular phenomenon by means of which the variation is effected.

Regions UV, WX and YZ of transmission devices 74, 75 and 76 respectively, represent regions having fixed phase velocity in operation, but which may be adjusted initially to provide suitable phase delays in accordance with considerations presently to be set forth.

The line AB represents a transverse isophase line along which the phases of signals in transmission devices 77, 78 and 79 are to remain equal. As in the application of the invention described above, this equality may be required to preserve the azimuth pattern of a beam of energy transmitted from radiators spaced along the regions CD, EF and GH of transmission devices 77, 78 and 79.

Now the total phase delay of signal travelling from source 70 to desired isophase line AB by way of transmission devices 76 and 79, is equal to the sum of the phase delay $D_1$ of signals travelling from source 70 to point Y with a phase velocity $v_1$, plus the delay $D_2$ produced in the region YZ of phase velocity $v_2$, plus the delay $D_3$ of region ZS characterized by a phase velocity $v_3$, plus the delay $D_4$ in the region ST of phase velocity $v_4$, plus the delay $D_5$ in propagating from T to G with velocity $v_5$, plus the delay $D_6$ experienced by signals in travelling from G to isophase line AB with a phase velocity $v_6$. Expressed mathematically:

$$\phi_1 - \phi_4 = D_1 + D_2 + D_3 + D_4 + D_5 + D_6 \qquad (1)$$

A similar expression:

$$\phi_1 - \phi_3 = D_7 + D_8 + D_9 + D_{10} + D_{11} + D_{12} \qquad (2)$$

may be written for the transmission path through devices 75 and 78, where $\phi_3$ is the phase in device 78 at isophase line AB, and the D's represent, respectively, the phase delays experienced by signals passing from P to W, W to X, X to I, I to J, J to E, and E to line AB, with respective phase velocities $v_7$, $v_8$, $v_9$, $v_{10}$, $v_{11}$ and $v_{12}$. Similarly, for the path through transmission devices 74 and 77, $$\phi_1 - \phi_2 = D_{13} + D_{14} + D_{15} + D_{16} \qquad (3)$$

where $\phi_2$ is the signal phase at line AB in device 77, and the D's represent, respectively, the phase delays in regions P to U, U to V, V to C, and C to line AB, these regions being characterized by respective phase velocities of $v_{13}$, $v_{14}$, $v_{15}$ and $v_{16}$.

Now, in typical applications of the invention, it is desired for one reason or another to vary the relative phases of signals at successive points along each of regions CD, EF, and GH, while maintaining the same phase for points along isophase line AB. In the preferred embodiment described hereinbefore, this variation is desired as a means for varying the elevation angle of a beam of energy transmitted by radiators spaced along these regions, while the invariance of the transverse phase relation is desired to preserve unchanged the azimuthal radiation pattern. The method proposed hereinbefore for varying the phases along the component arrays is to vary the phase velocities therein, and, in fact, to vary them uniformly and equally in the several component arrays.

The phase delay in any region of length $s$ equals $\int v \cdot ds$, and for a region characterized by a phase velocity which is uniform throughout the length thereof, equals $v \cdot s$. Thus, in the preferred embodiment, $D_6 = v_6 s_6$, where $s_6$ equals the length of the transmission device 79 from G to isophase line AB. Similarly, $D_{12} = v_{12} s_{12}$ and $D_{16} = v_{16} s_{16}$. In the preferred embodiment, the phase velocities $v_6$, $v_{12}$ and $v_{16}$ are equal at all times, and are varied by the motion of the dielectric strips. The difference among the delays $D_6$, $D_{12}$ and $D_{16}$ therefore vary in proportion to the lengths of the corresponding regions. Thus, $$(D_{16} - D_{12}) = v_{16}(s_{16} - s_{12})$$

and $(D_{12} - D_6) = v_{16}(s_{12} - s_6)$. Obviously then, if signals of any fixed phase relation are supplied to the input ends of regions CD, EF, and GH, the transverse phase relations of the signals along line AB will vary in proportion to the variations in phase velocity, and with proportionality constants equal to the corresponding differences in path length in the regions of variable phase velocity. Accordingly, if signals of any fixed phase relation be applied to the transmission devices 77, 78 and 79, the desired invariant transverse phase relation will not be obtained when the phase velocities in these devices are varied.

Reconsidering Equations 1, 2 and 3 above, the effect of equal variations in $v_6$, $v_{12}$ and $v_{16}$ is to vary unequally $D_6$, $D_{12}$ and $D_{16}$, due to the differences in length of the corresponding regions of variable phase evlocity. The phase differences $(\phi_1-\phi_4)$, $(\phi_1-\phi_3)$ and $(\phi_1-\phi_2)$ therefore cannot be maintained equal if $D_1$, $D_{12}$ and $D_{16}$ are permitted to vary while the remaining delays $D_1 \ldots D_5$, $D_7 \ldots D_{11}$, and $D_{13} \ldots D_{15}$ are maintained constant.

In accordance with the invention, certain of these remaining delays are caused to vary in such manner as to introduce variations in the relative phases of signals supplied to transmission devices 77, 78 and 79, which are in each case equal and opposite to the variations in phase relation introduced at the desired isophase line AB by the above-described variations in $D_6$, $D_{12}$ and $D_{16}$. Thus, the above-described variable phase difference $$(D_{12}-D_6)=v_{16}(s_{12}-s_6)$$

between the phase delays in regions EF and GH, are counteracted by supplying signals to regions EF and GH which have an opposite variable phase difference $-v_{16}(s_{16}-s_{12})$. To accomplish this, regions IJ and ST of controllably-variable phase velocity may be so controlled that the phase delay difference $$D_{10}-D_4=(D_{12}-D_6)$$

This may be accomplished, as in the preferred embodiment described hereinbefore, by causing the phase velocities $v_{12}$, $v_6$, $v_{10}$ and $v_4$ in regions EF, GH, IJ and ST to be substantially equal at all times, and by choosing the length of region ST to exceed that of region IJ by the amount $s_{12}-s_6$. When this is done, the total variable phase delay $(D_{10}+D_{12})$ for transmission devices 75 and 78, equals the total variable phase delay $(D_4+D_6)$ for transmission devices 76 and 79, despite variations in the phase velocity in regions EF and GH. Accordingly, the variations in the phases $\phi_3$ and $\phi_4$ at line AB are equal at all times. It is understood that the apparatus by which the delays $D_{10}$ and $D_4$ are varied may have any of a variety of forms such as those suggested above with regard to delays $D_6$ and $D_{12}$.

In addition to maintaining equal phase variations along line AB, it is also required, in the preferred embodiment, that AB be an isophase line, so that the absolute values of the phases therealong may be equal. To accomplish this, the absolute values of the phase delays $(\phi_3-\phi_1)$ and $(\phi_4-\phi_1)$ should be made equal or should differ only by an integral number of cycles. Since $D_{10}+D_{12}=D_4+D_6$ by the previously-described adjustment, it is then necessary that $$D_1+D_2+D_3+D_5=D_7+D_8+D_9+D_{11},$$

or differ therefrom by an integral number of cycles. Since the delays $D_1$, $D_3$, $D_5$, $D_7$, $D_9$ and $D_{11}$ may be determined at least in part by the geometric configuration or other practical requirements of the particular system to which the invention is applied, the delays $D_2$ and $D_8$ provide convenient means for effecting the above equality. In the embodiment described hereinbefore in detail, $D_2$ and $D_3$ may be provided by dielectric strips within a waveguide, the lengths, widths, heights, compositions, and positions of the strips being chosen to provide the above-specified phase equality at line AB. Other signal delay means may, of course, alternatively be employed.

Since $(D_{12}-D_6)=-(D_{10}-D_4)$, it follows that $D_{10}+D_{12}=D_4+D_6$, that is, the sum of the variable delays are equal for the two signal paths from the source to the isophase line AB. The exact order of the various regions of the two paths, and the manner in which they distributed, is not generally of fundamental importance so long as the sum of the variable delays is the same for the two paths.

This fact is indicated by a comparison with the third signal path through transmission device 74 and 77. In this case, the variable delay $D_{16}$ in the radiating transmission device, itself equals the sum of the delays $(D_4+D_6)$, or $(D_{10}+D_{12})$. In this particular case, then, no additional variable delay is necessary or desirable in transmission device 74. Accordingly, only the fixed phase delay region UV need be employed, the delay $D_{14}$ of which is so chosen that $$D_{13}+D_{14}+D_{15}=D_7+D_8+D_9+D_{11}$$

or differs therefrom by an integral number of cycles.

To facilitate ready comprehension, the invention has been described with particular reference to certain specific embodiments thereof. However, it will be apparent to one skilled in the art that it is susceptible of embodiment in any of a number of forms, and will find use in a large variety of applications. For example, the invention may be applied to an antenna array in which the radiating elements are dipoles and polyrods, instead of the slots described above. Further, it may find application in systems other than antennae, in which control is exerted as to the phases of signals supplied to energy utilization devices other than radiators, such as field-exploring probes utilized in conjunction with laboratory test equipment. It is also understood that the variations in phase delay utilized to control signal phasing in the manner described hereinbefore, need not rely for their production upon variations in phase velocity alone, but may be produced at least in part by mechanical variations in path length of the several transmission devices, as by mechanical operation of a telescoping type of waveguide structure, for example. Further, as indicated hereinbefore a principal use of the preferred embodiment of the invention may be to provide gyroscopically-controlled elevational stabilization of the antenna beam, and, accordingly, the phase-shifting mechanisms may be operated in response to any suitable mechanical or automatic arrangement, rather than by hand.

I claim:

1. In an antenna system comprising a plurality of laterally-spaced component arrays of radiating elements and a plurality of feed means for supplying successive elements of each of said arrays with increasingly delayed wave signals, said radiating elements of each array being coupled to spaced points on the corresponding feed means, said feed means each comprising at least one section in which the phase velocity of signals supplied to the input end thereof is controlledly variable, apparatus for maintaining a predetermined fixed phase relation between signals at points in said arrays lying along a predetermined line transverse to said component arrays, said points being located in said sections in which the phase velocity is variable, said points being differently distant from said input ends of said sections, said apparatus comprising: a plurality of energy-transmissive, phase-compensating means, each arranged to supply wave signals to one of said feed means and to the input end of said section thereof in which the phase velocity is variable, at least all but one of said phase-compensating means each comprising a section in which the phase delay is controlledly variable, the sum of said last-named phase delay, plus the phase delay in said section of variable phase velocity of the feed means associated therewith up to said transverse line, being substantially the same for each feed guide and its corresponding phase-compensating means; and means for varying said phase delays of said feed means and said phase compensating means synchronously.

2. The system of claim 1, in which the said phase compensating means comprise apparatus for varying the phase velocities of signals therein.

3. The system of claim 1, in which said sections of variable delay of said phase-compensating means, and said sections of variable phase velocity of said feed means, each comprise a section of transmission line containing a longitudinally disposed strip of material susceptible of transverse motion within said transmission line and having a dielectric constant substantially different from that of other matter contained within said section.

4. The system of claim 1, in which said radiating elements lie substantially within a predetermined plane and said phase-compensating means lie substantially completely outside said plane.

5. In an antenna phasing system: first energy-transmissive feed means having at least a single energy-utilization device coupled thereto at a predetermined first point therein, and having an input end adapted to be supplied with wave energy; second energy-transmissive feed means having at least a single energy-utilization device coupled thereto at a predetermined second point therein, and also having an input end adapted to be supplied with wave energy; the positions of said coupling points being such that the phase delay of wave energy in traversing said first feed means from said input end thereof to said first point therein, differs from the phase delay of wave energy in traversing said second feed means from said input end thereof to said second point therein; first phase-velocity varying means associated with said first feed means for varying the phase-velocity of wave energy in said first feed means; second phase-velocity varying means associated with said second feed means for varying the phase-velocity of wave energy in said second feed means by amounts substantially equal to those by which said phase velocity in said first feed means is varied; and means for maintaining a substantially fixed relation between the phases of wave energy at said first and second points respectively, said last-named means comprising first and second complementary transmission devices for supplying said wave energy to said input ends of said first and second feed means respectively, phase-delay varying means associated with at least said first complementary transmission device for varying the phase-delay of said wave energy therein, and means for controlling said first phase-velocity varying means, said second phase-velocity varying means and said phase-delay varying means so as to maintain the total of the variations in phase delay encountered by said wave energy in traversing said first complementary transmission device and said first energy-transmissive feed means up to said first point therein, substantially equal to the total of the variations in phase delay experienced by said wave energy in traversing said second complementary transmission device and said second energy-transmissive means up to said second point therein.

6. The system of claim 5, in which said energy-utilization devices comprise radiators of wave energy.

7. The system of claim 5, in which said phase-delay varying means comprises apparatus for varying the phase velocity of said wave-energy in at least said first complementary transmission device.

8. The system of claim 7, in which the sum of the lengths of said first complementary transmission device and of said first feed means within which said phase velocity is varied, up to said predetermined first point, is substantially equal to the sum of the lengths of said second complementary transmission device and of said second feed means within which said phase velocity is varied, up to said second point.

9. In an electrical wave propagation system: first energy-transmissive feed means having a plurality of energy utilization devices coupled thereto at spaced points, and having an input end adapted to be supplied with wave energy; a second energy transmissive feed means having a second plurality of energy utilization devices coupled thereto at spaced points, and also having an input end adapted to be supplied with wave energy; the points of coupling of said energy utilization devices to said feed means being such that the distance from a selected one of said energy utilization devices associated with said first feed means to the input end of said first feed means differs from the distance from a selected one of said energy utilization devices associated with said second feed means to the input end of said second feed means; first phase-velocity varying means associated with said first feed means for varying the velocity of wave energy in the section of said first feed means including said spaced coupling points; second phase-velocity varying means associated with said second feed means for varying the phase-velocity of wave energy in the section of said second feed means including said spaced coupling points, said first and second phase-velocity varying means having similar control characteristics, at least one of said sections including a region between one of said selected ones of said energy utilization devices and the input end of the corresponding feed means; and means for maintaining a substantially fixed relation between the phase of wave energy at said selected energy utilization device associated with said first feed means and the phase of wave energy at said selected energy utilization device associated with said second feed means, said last-named means comprising first and second complementary transmission devices for supplying said wave energy to said input ends of said first and second feed means respectively, phase-delay varying means associated with at least said first complementary transmission device for varying the phase-delay of said wave energy therein, and means for controlling in synchronism said first phase-velocity varying means, said second phase velocity varying means and said phase-delay varying means so as to maintain the total of the variations in phase delay encountered by said wave energy in traversing said first complementary transmission device and said first energy-transmissive feed means up to said selected one of said energy utilization devices associated therewith substantially equal to the total variations in phase delay experienced by said wave energy in traversing said second complementary transmission device and said second energy-transmissive means up to said selected one of said energy utilization devices associated therewith.

10. An antenna array comprising first and second laterally spaced energy-transmissive feed means, each of said feed means having a plurality of energy radiating devices coupled thereto at spaced points, and having an input end adapted to be supplied with wave energy, the positions of said energy radiating devices being such that the distance from a selected one of said energy radiating devices associated with said first feed means to the input end of said first feed means differs from the distance from a selected one of said energy radiating devices associated with said second feed means to the input end of said second feed means; first phase-velocity varying means associated with said first feed means for varying the velocity of wave energy in the region of said first feed means including said spaced coupling points; second phase-velocity varying means associated with said second feed means for varying the phase-velocity of wave energy in the region of said second feed means including said spaced coupling points, said first and second phase-velocity varying means having similar control characteristics; at least one of said regions including a region between one of said selected ones of said energy radiating devices and the input end of the corresponding feed means; and means for maintaining a substantially fixed relationship between the phase of wave energy at said selected energy radiating device associated with said first feed means and the phase of wave energy at said selected energy utilization device associated with said second feed means, said last-named means comprising first and second complementary transmission devices for supplying said wave energy to said input ends of said first and second feed means respectively, phase-delay varying means associated with at least said first complementary transmission device for varying the phase-delay of said wave energy therein, and means for controlling in synchronism said first phase-velocity varying means, said second phase-velocity varying means and said phase-delay varying means so as to maintain the total of the variations in phase delay encountered by said wave energy in traversing said first complementary transmission device and said first energy transmissive feed means up to said selected one of said energy radiating devices associated therewith substantially equal to the total variations in phase delay experienced by said wave energy in traversing said second complementary transmissive device and said second energy-transmissive means up to said selected one of said energy radiating devices associated therewith.

11. An antenna array comprising a plurality of coplanar, parallel, linear energy transmissive feed means, each of said feed means having a plurality of energy radiating devices associated therewith at spaced points thereon, and having an input end adapted to be supplied with wave energy; said feed means being so disposed that a line transverse to said feed means intersects said feed means at different distances from the input ends thereof, each of said feed means being provided with a phase-velocity varying means for varying the velocity of wave energy in the section including said energy radiating devices, the spacing between the input end of said feed means and the adjacent end of said section of variable phase-velocity being approximately the same for each of said feed means, at least a portion of said section of variable velocity for at least one of said feed means lying between said input end of said last-mentioned feed means and the point of intersection of said transverse line therewith, and means for maintaining a substantially fixed relation between the phases of wave energy at points corresponding to the intersection of said transverse line and the respective feed means, said last-named means comprising a plurality of transmission devices, each arranged to supply wave energy to a corresponding one of said feed means, at least all but one of said transmission devices including phase-delay varying means for varying the phase delay of wave energy therein, and means for controlling in synchronism all of said phase-velocity varying means and all of said phase delaying means so as to maintain the total variation in phase delay encountered by said wave energy in traversing said transmission devices and said feed means up to the point of intersection of said feed means with said transverse line substantially the same for all of said combinations of transmission devices and feed means.

12. An antenna array comprising a plurality of coplanar, parallel, linear feed transmission lines, each of said feed transmission lines having a plurality of energy radiating devices associated therewith at spaced points thereon, and having an input end adapted to be supplied with wave energy; said feed transmission lines being so disposed that a line transverse to said feed transmission lines intersects said feed transmission lines at different distances from the input end thereof, each of said feed transmission lines being provided with a phase-velocity varying means for varying the velocity of wave energy in the region including said energy radiating devices, said phase-velocity varying means each comprising a longitudinally disposed strip of material susceptible of transverse motion within said feed transmission line associated therewith and having a dielectric constant substantially different from that of other matter contained within said region, the spacing between the input end of the feed transmission line and the adjacent end of said dielectric strip being substantially the same for each of said feed transmission lines, at least a portion of said region of variable phase velocity for at least one of said feed transmission lines lying between said input end thereof and the point of intersection of said transverse line therewith, and means for maintaining a substantially fixed relation between the phases of wave energy at points corresponding to the intersection of said transverse line and the respective feed transmission lines, said last-mentioned means comprising a plurality of phase-compensating transmission lines, each arranged to supply wave energy to a corresponding one of said feed transmission lines, at least all but one of said phase-compensating transmission lines including phase velocity varying means for varying the phase velocity of wave energy therein, and means for controlling in synchronism all of said phase-velocity varying means so as to maintain the total variation in phase delay encountered by said wave energy in traversing a feed transmission line and a phase-compensating transmission line up to the point of intersection of said feed transmission line with said transverse line substantially the same for all said combinations of phase compensating transmission lines and feed transmission lines.

13. An antenna array comprising a plurality of coplanar, parallel, linear feed waveguides, each of said feed waveguides having a plurality of energy radiating devices associated therewith at spaced points thereon, said radiating devices being included within a circle of which said feed waveguides form spaced parallel chords, each of said feed waveguides having an input end disposed substantially on said circle and adapted to be supplied with wave energy, each of said feed waveguides being provided with a longitudinally disposed strip of material susceptible of transverse motion within said waveguide and having a dielectric constant substantially different from that of other matter contained within said waveguide, said dielectric strips having lengths corresponding to the lengths of the chords formed by the corresponding feed waveguides, and means for maintaining a substantially fixed relation between the phases of wave energy at points along a line perpendicular to said chords, said last-named means comprising a plurality of phase compensating waveguides, each arranged to supply wave energy to a corresponding one of said feed waveguides, at least all but one of said phase compensating waveguides including a longitudinally disposed strip of material susceptible of transverse motion within said waveguide and having a dielectric constant substantially different from that of other matter contained within said phase compensating waveguide, the sum of the length of said dielectric strip in said feed waveguide and the length of said strip in the corresponding phase compensating waveguide being substantially the same for all said combinations of feed waveguide and phase compensating waveguide, and means for simultaneously imparting transverse motion to all of said dielectric strips thereby to vary the relative phases of energy present at the radiating elements associated with any one feed waveguide while maintaining said fixed phase relation of the energy along the line transverse to said feed waveguides.

14. The antenna array of claim 13 wherein said phase-compensating waveguides are disposed in a plane parallel to the plane of said feed waveguides and wherein each of said phase compensating waveguides is disposed parallel to the said feed waveguide with which it is associated.

15. A wave propagation system having a plurality of paths, each of said paths including wave transmission means of a first characteristic and wave transmission means of a second characteristic, said wave transmission means of said second characteristic including means for varying the phase velocity of wave energy propagated therein, the total length of the wave transmission means of said second characteristic being the same for each of said paths, said wave transmission means of said second characteristic being divided into first and second sections in at least all but one of said paths, the lengths of said first sections being different for different paths, said second sections being disposed between the first section of a path and the point at which wave energy is supplied to that path, each of said first sections being provided with a plurality of energy utilization devices coupled thereto at spaced locations, and means for simultaneously varying by equal amounts the phase velocity of the wave energy in all of said sections, thereby to vary the relative phases of wave energy supplied to said energy utilization devices of any one path while maintaining a fixed relationship between the phases of the wave energy at a selected point in each of said first sections.

References Cited in the file of this patent

UNITED STATES PATENTS

| | | |
|---|---|---|
| 2,453,414 | De Vore | Nov. 9, 1948 |
| 2,594,409 | Feldman | Apr. 29, 1952 |
| 2,602,893 | Ratliff | July 8, 1952 |
| 2,605,413 | Alvarez | July 29, 1952 |
| 2,628,311 | Lindenblad | Feb. 10, 1953 |

UNITED STATES PATENT OFFICE

Certificate of Correction

Patent No. 2,831,190                                                      April 15, 1958

Vernon E. Trinter

It is hereby certified that error appears in the above numbered patent requiring correction and that the said Letters Patent should read as corrected below.

Column 2, lines 40 and 41, for "antena", each occurrence, read —antenna—; column 10, line 13, for "wih" read —with—; line 33, for "y" read —by—; column 11, line 4, for "evlocity" read —velocity—; line 27, for $$D_{10}-D_4=(D_{12}-D_6) \quad\quad \text{read} \quad\quad D_{10}-D_4=-(D_{12}-D_6)$$

Signed and sealed this 29th day of September 1959.

[SEAL]

Attest:
KARL H. AXLINE,
*Attesting Officer.*

ROBERT C. WATSON,
*Commissioner of Patents.*